United States Patent
Brouwer et al.

(10) Patent No.: US 9,260,238 B2
(45) Date of Patent: Feb. 16, 2016

(54) METHOD FOR PROVIDING A BEVERAGE PROVIDED WITH A FINE-BUBBLE FROTH LAYER OR A BEVERAGE AT LEAST VIRTUALLY WITHOUT THE FINE BUBBLE FROTH LAYER, PAD WITH COVERING FILLED WITH PRODUCT TO BE EXTRACTED AND/OR TO BE DISSOLVED; ASSEMBLY PROVIDED WITH SUCH A PAD AND A HOLDER; BEVERAGE PREPARATION APPARATUS FOR PREPARING A BEVERAGE (75) Inventors: Gustaaf Frans Brouwer, Nijkerk (NL); Hendrik Cornelis Koeling, Amersfoort (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 1429 days.

(21) Appl. No.: 12/376,952

(22) PCT Filed: Aug. 10, 2007

(86) PCT No.: PCT/NL2007/050398
§ 371 (c)(1),
(2), (4) Date: Jul. 29, 2009

(87) PCT Pub. No.: WO2008/018794
PCT Pub. Date: Feb. 14, 2008

(65) Prior Publication Data
US 2010/0189844 A1   Jul. 29, 2010

(30) Foreign Application Priority Data
Aug. 10, 2006  (NL) ..................................... 1032293

(51) Int. Cl.
*B65D 81/34* (2006.01)
*B65D 85/804* (2006.01)
(Continued)

(52) U.S. Cl.
CPC ......... *B65D 85/8046* (2013.01); *A47J 31/0678* (2013.01); *A47J 31/4496* (2013.01);
(Continued)

(58) Field of Classification Search
CPC ............. B65D 85/8043; B65D 85/816; B65D 85/804; B65D 65/46; B65D 2581/3049; B65D 85/8046; B65D 29/02; B65D 29/06; A47J 31/0678; A47J 31/4496; A47J 31/0615; A47J 31/0621; A47J 31/0668; A47J 31/3623; A47J 31/369; A47J 31/3676; A47J 31/368
USPC ......... 426/77, 78, 79, 80, 115, 394, 431, 432, 426/433, 434, 435; 99/295, 298, 299
See application file for complete search history.

(56) References Cited

U.S. PATENT DOCUMENTS 3,433,464 A   3/1969   Swafford et al.
3,450,024 A   6/1969   Martin
(Continued)

FOREIGN PATENT DOCUMENTS

DE   40 37 366 A1   5/1992
DE   42 13 895 A1   11/1992
(Continued)

OTHER PUBLICATIONS
Definition of "pad", and "sheet", Webster's New World Dictionary, 3rd College Edition, Simon & Schuster, Inc., 1988.*
(Continued)

*Primary Examiner* — Viren Thakur
(74) *Attorney, Agent, or Firm* — Foley & Lardner LLP (57) ABSTRACT

Method, pad and assembly of pad and holder and beverage preparation, apparatus (1) for providing a beverage provided with a fine bubble froth layer or a beverage at least virtually without the fine bubble froth layer with the aid of a pad (6) with a covering (26) filled with at least a product (28) to be extracted and/or to be dissolved. The method comprises selecting using the pad (6) in a first (A) or a second (B) condition of use, and using the pad (6) according to the selection the pad (6) in the first condition of use (A) or in the second condition of use (B). In the first condition of use (A), a fine bubble froth layer is obtained on the beverage. In the second condition of use (B), a beverage is obtained which is at least virtually free of such a fine bubble froth layer.

8 Claims, 6 Drawing Sheets

(51) Int. Cl.
*B65D 85/816* (2006.01)
*A47J 31/06* (2006.01)
*A47J 31/44* (2006.01)

(52) U.S. Cl.
CPC ......... *B65D85/8043* (2013.01); *A47J 31/0615* (2013.01); *A47J 31/0621* (2013.01); *A47J 31/0668* (2013.01)

(56) References Cited

U.S. PATENT DOCUMENTS

| | | | |
|---|---|---|---|
| 4,446,158 | A | 5/1984 | English et al. |
| 4,694,740 | A | 9/1987 | Daloz et al. |
| 4,801,464 | A | 1/1989 | Hubbard, Jr. |
| 4,996,066 | A | 2/1991 | Love et al. |
| 5,043,172 | A | 8/1991 | Loizzi |
| 5,082,676 | A | 1/1992 | Love et al. |
| 5,249,509 | A | 10/1993 | English |
| 5,265,519 | A | 11/1993 | Schiettecatte et al. |
| 5,477,775 | A | 12/1995 | Delhom et al. |
| 5,518,743 | A | 5/1996 | Pergola et al. |
| 5,638,740 | A | 6/1997 | Cai |
| 5,895,672 | A | 4/1999 | Cooper |
| 5,906,845 | A * | 5/1999 | Robertson ................... 426/80 |
| 5,913,962 | A | 6/1999 | Gasser et al. |
| 6,004,593 | A | 12/1999 | Soughan |
| 6,009,792 | A | 1/2000 | Kraan |
| 6,499,689 | B1 | 12/2002 | Miyazaki |
| 6,740,345 | B2 * | 5/2004 | Cai ................... 426/77 |
| 6,769,352 | B2 | 8/2004 | de Bruin et al. |
| 6,777,007 | B2 | 8/2004 | Cai |
| 6,784,850 | B2 | 8/2004 | Morooka et al. |
| 6,840,158 | B2 | 1/2005 | Cai |
| 7,021,198 | B1 | 4/2006 | Lyall, III |
| 2001/0053399 | A1 | 12/2001 | Herod |
| 2002/0078831 | A1 | 6/2002 | Cai |
| 2004/0197444 | A1 | 10/2004 | Halliday et al. |
| 2004/0244599 | A1 | 12/2004 | Wei |
| 2005/0003060 | A1 | 1/2005 | Steenhof et al. |
| 2005/0076783 | A1 | 4/2005 | Kodden et al. |
| 2005/0158426 | A1 | 7/2005 | Hu et al. |

FOREIGN PATENT DOCUMENTS

| | | | |
|---|---|---|---|
| EP | 0615921 A1 | | 9/1994 |
| EP | 0 878 158 | | 11/1998 |
| EP | 1101430 A1 | | 5/2001 |
| EP | 1 317 200 | | 6/2003 |
| EP | 1554958 | | 7/2005 |
| EP | 1 579 793 | | 9/2005 |
| EP | 1579793 | | 9/2005 |
| EP | 1579793 A1 * | | 9/2005 |
| GB | 989886 | | 4/1965 |
| JP | 03169311 | | 7/1991 |
| JP | 646815 | | 2/1994 |
| JP | 06315437 | | 11/1994 |
| WO | WO 89/12416 A2 | | 12/1989 |
| WO | WO 00/51478 | | 8/2000 |
| WO | WO 02/074143 A2 | | 9/2002 |
| WO | WO-03/105642 | | 12/2003 |
| WO | WO 2004/056246 A1 | | 7/2004 |
| WO | WO 2005/018394 A1 | | 3/2005 |
| WO | WO 2005092160 A1 * | 10/2005 | ............ A47J 31/06 |
| WO | WO 2006/016814 | | 2/2006 |
| WO | WO-2006/043098 | | 4/2006 |
| WO | WO 03/059778 | | 7/2006 |
| WO | WO 2008/018793 A2 | | 2/2008 |
| WO | WO-2008/148650 | | 12/2008 |

OTHER PUBLICATIONS

U.S. Appl. No. 12/376,952, filed Feb. 9, 2009, Brouwer.
International Preliminary Report on Patentability and Written Opinion of WO 2008/018793, dated Feb. 10, 2009, 6 pages.
International Preliminary Report on Patentability and Written Opinion of WO 2008/018794, dated Feb. 10, 2009, 9 pages.

* cited by examiner

METHOD FOR PROVIDING A BEVERAGE PROVIDED WITH A FINE-BUBBLE FROTH LAYER OR A BEVERAGE AT LEAST VIRTUALLY WITHOUT THE FINE BUBBLE FROTH LAYER, PAD WITH COVERING FILLED WITH PRODUCT TO BE EXTRACTED AND/OR TO BE DISSOLVED; ASSEMBLY PROVIDED WITH SUCH A PAD AND A HOLDER; BEVERAGE PREPARATION APPARATUS FOR PREPARING A BEVERAGE

CROSS-REFERENCE TO RELATED APPLICATIONS

The present application claims priority as a national stage application of International Patent Application Serial No. PCT/NL2007/050398 filed on Aug. 10, 2007; which claimed priority to The Netherlands Application Serial No. NL 1032293 filed on Aug. 10, 2006, both of which are hereby incorporated by reference.

BACKGROUND

The invention relates to a method for providing a beverage provided with a fine bubble froth layer or a beverage at least virtually without the fine bubble froth layer with the aid of a pad with a covering filled with at least a product to be extracted and/or to be dissolved, wherein the method comprises supplying a fluid, such as water, under pressure to the pad so that the fluid is pressed through the pad for obtaining a beverage which, thereupon, leaves the pad.

WO 2006/016814 describes that the pad is placed in the holder and, together with this holder, is placed in a fluid flow path. After this, water under pressure is passed through the fluid flow path. In the pad, an extract and/or solution is formed. With the described method, the user can set the beverage preparation system in a first modus in which the beverage without the fine bubble froth layer is provided, or in a second modus in which the beverage with the fine bubble froth layer is provided. In WO 2006/016814, this is achieved by, for instance, providing the system with a restriction for forming a jet for forming the fine bubble froth layer, or with a restriction not forming a froth layer. In a practical embodiment, in WO 2006/016814, the system is provided with a first holder for providing the beverage without the froth layer and with a second holder, exchangeable with the first holder, for providing the beverage with the froth layer. When the second holder is used, furthermore, a flow restriction located upstream of the product is to be switched on or provided, and when the first holder is used, the flow restriction is to be switched off or removed.

A drawback of the described method is that two adaptations are involved that are to be carried out for selecting whether, indeed, a fine bubble froth layer, or at least no fine bubble froth layer is formed. This is economically disadvantageous and can furthermore give rise to mistakes if only one of the two adaptations is provided when, instead of at least virtually no fine bubble froth layer, conversely, a fine bubble froth layer is to be selected, and vice versa.

It is an object of the invention to remedy the above-mentioned drawback and/or to provide an alternative method for providing the beverage provided with the fine bubble froth layer or the beverage at least virtually without the fine bubble froth layer with the aid of a pad.

SUMMARY

To this end, according to the invention, the method is characterized in that the method comprises providing the pad comprising a covering with at least a first side and a second side, while the pad is provided on the second side of the covering with a spout opening; selecting using the pad in a first or second condition of use; using the pad according to the selection made in the first condition of use or in the second condition of use wherein, in the first condition of use, the fluid is supplied to the product in the covering via the first side of the covering, so that the fluid flows through the pad for obtaining the beverage which leaves the pad via the spout opening in the form of a jet of the beverage for obtaining a fine bubble froth layer on the beverage with the aid of the jet, and wherein, in the second condition of use, the fluid is supplied via the spout opening to the product in the covering so that the fluid flows through the pad for obtaining the beverage which leaves the pad via the first side of the covering not in the shape of such a jet, so that a beverage is obtained that is at least virtually free of such fine bubble froth layer.

In this manner, it is possible to provide the beverage with or without the fine bubble froth layer with one and the same pad, while, by selecting whether the fluid is supplied to the first side of the pad or to the spout opening of the pad, it can be determined whether the beverage is provided with, or at least virtually without the fine bubble froth layer.

Preferably, the first side and the second side are opposite each other. As a result, by reversing or not reversing the pad (through, substantially, 180°) it can be selected whether the beverage is prepared with or at least virtually without the fine bubble froth layer. In one embodiment, it applies that in the first condition of use, the fluid flows through the pad in a first through flow direction and that, in the second condition of use, the fluid flows through the pad in a second through flow direction which is opposite the first through flow direction.

Generally, the method comprises providing a holder and placing the pad in the holder.

Preferably, the first through flow direction of the pad, in the first condition of use, is substantially equal to the flow direction of the fluid in the holder. Preferably, in the second condition of use, the second through flow direction of the pad is substantially equal to the flow direction of the fluid in the holder. In this manner, by placing the pad in the holder with the first through flow direction substantially equal to the flow direction of the fluid, it is possible to prepare the beverage with the fine bubble froth layer and, by placing the pad in the holder with the second through flow direction, substantially opposite to the first through flow direction, substantially equal to the flow direction of the fluid, to prepare the beverage without the fine bubble froth layer.

Preferably, a flow direction of the fluid in the holder in the first condition of use is equal to a flow direction of the fluid in the holder in the second condition of use. Thus, the holder can be flowed through by the fluid in the same manner when the beverage with or without the fine bubble froth layer is prepared. It is therefore not necessary to reverse the flow direction of the fluid in the holder for obtaining the first or the second condition of use. In this manner, it is possible to use a beverage preparation apparatus wherein the beverage preparation apparatus itself needs not be set for obtaining, at will, the beverage with or without the fine bubble froth layer.

More generally, it therefore holds that the method comprises: for the first condition of use, placing the pad in the holder in a first position and, for the second condition of use, placing the pad in the holder in a second position opposite to the first position with respect to the flow direction of the fluid. Thus, by selecting the position of the pad relative to the flow direction of the fluid in the holder (by reversing or not reversing the pad), it can be determined whether the beverage with or at least virtually without the fine bubble froth layer is prepared. This offers the advantage that it is not necessary to set a used beverage preparation apparatus for preparing the beverage with or without the fine bubble froth layer.

Preferably, the holder is provided with a bottom with at least one opening, wherein, in the first condition of use, the second side of the covering rests on the bottom, with the spout opening located above or in the opening so that the jet leaves the holder via the opening of the holder and wherein, in the second condition of use, the first side of the covering rests on the bottom. This offers the advantage that the pad can simply be received in the holder, and that the spout opening is free from the holder in a manner such that, in use, in the first condition of use, the beverage can leave the spout opening in the form of the jet.

It is preferred that, on the first side, the covering is at least partly designed as a filter that is transmissive to the fluid and the beverage and is at least virtually non-transmissive to the product. Thus, in a simple manner, in the first condition of use, the fluid can be supplied to the product in the covering via the first side of the covering and, in the second condition of use, the beverage can leave the pad via the first side of the covering.

Preferably, on the second side, the covering is designed as a material that is at least virtually non-transmissive to the fluid, the beverage and the product. What is achieved in this manner is that in the first condition of use the beverage leaves the pad substantially exclusively via the spout opening in the form of the jet.

In the second condition of use, it is preferred that the fluid is supplied under pressure to the second side of the pad, so that the fluid flows into the pad via the spout opening. Therefore, in the second condition of use, the spout opening functions as flow restriction, and a feed through speed of the fluid through the product in the covering will be lower than if the flow restriction was not present. Thus, a greater efficiency of the product to be extracted and/or to be dissolved is obtained.

Preferably, the covering on the first side is formed by a first sheet and, on the second side, by a second sheet. This offers the advantage that the easy-to-manufacture pad is provided.

The invention further relates to a pad with covering filled with product to be extracted and/or to be dissolved, wherein, in use, a fluid, such as water, is supplied under pressure to the pad, so that the fluid flows through the pad for obtaining a beverage which, thereupon, leaves the pad.

According to the invention, the pad is characterized in that the pad is provided with a spout opening, while the pad is designed such that, according to the method according to the invention, it can be used, at will, in the first or second condition of use.

The invention also relates to an assembly provided with such a pad and a holder.

The invention further relates to a beverage preparation apparatus for preparing a beverage by means of extraction and/or dissolution, wherein the beverage preparation apparatus is provided with such an assembly, wherein the holder is designed for holding the pad, and fluid supply means for supplying the fluid under pressure to the pad.

BRIEF DESCRIPTION OF THE DRAWINGS

Presently, the invention will be further elucidated by way of non-limitative example with reference to the drawing. In the drawing.

DETAILED DESCRIPTION OF THE INVENTION

In the drawing, identical reference numerals refer to identical parts.

Figure 1A:
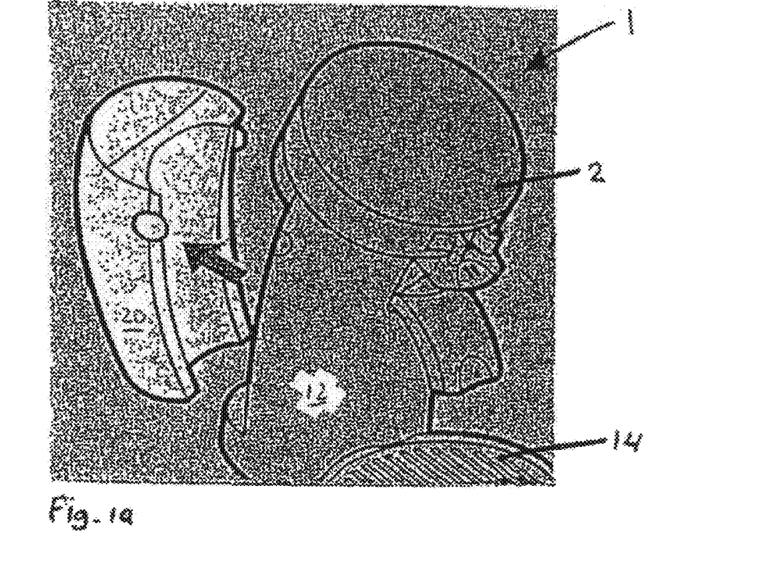
FIG. 1a shows a perspective view of a beverage preparation apparatus.
Figure 1B:
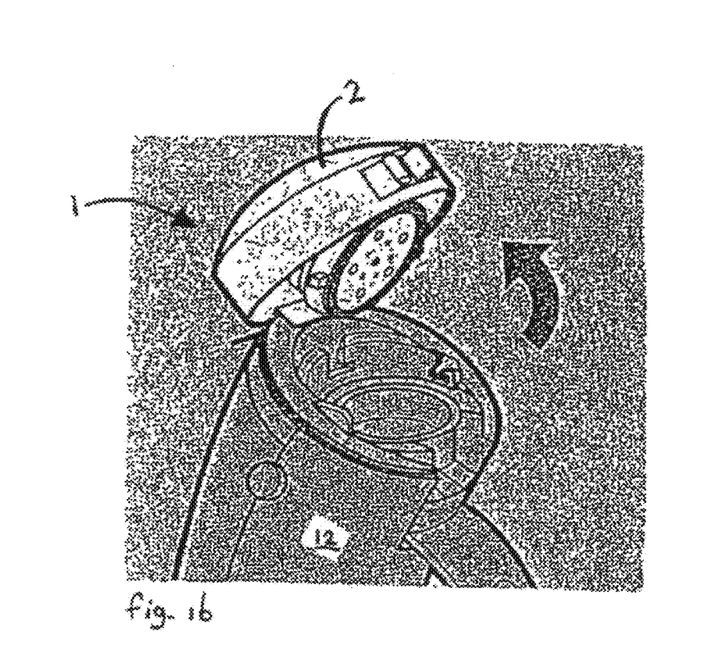
FIG. 1b shows a perspective view of the beverage preparation apparatus of FIG. 1a with an opened lid.
Figure 1C:
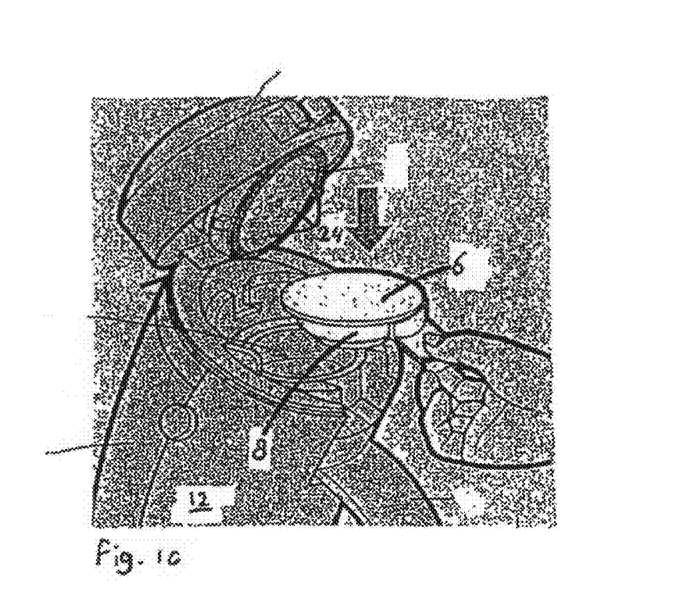
FIG. 1c shows a perspective view of the beverage preparation apparatus of FIG. 1a, wherein it is shown how a holder can be placed in the apparatus.

FIGS. 1a-c show a perspective view of a beverage preparation apparatus 1 for preparing a beverage by means of extraction and/or dissolution. Here, FIG. 1a shows the beverage preparation apparatus 1 with a closed lid and FIGS. 1b and 1c show the beverage preparation apparatus with an opened lid 2. In FIGS. 1a-c, more specifically, a coffee machine 1 is involved. The coffee machine 1 shown is suitable for receiving an assembly 4 provided with a pad 6 and a holder 8 (see FIGS. 2a and 2b). The holder 8 is designed for holding the pad 6 and is placed, in use, at least partly downstream of the pad 6. If the lid 2 is closed, the holder 8 is closed by means of a holder lid 9 (see FIG. 3). The coffee machine 1 further comprises a housing 12 and a foot 14, on which foot 14 one or two cups (not shown in the Figures) can be arranged during the preparation of the beverage. The housing 12 further comprises fluid supply means 16, in this example a conduit (see FIG. 3) for supplying a fluid, in particular a liquid, in case of the coffee machine 1, water, to the pad 6. The housing 12 further comprises frothing means 52, formed, in this example, by a buffer reservoir 18, in which, in a condition of use, froth can be formed, a water reservoir 20 and a fluid dispensing unit 22, in this example a hot water dispensing unit, for supplying the, in this example, hot, water, from the water reservoir 20, through the fluid supply means 16 and supply openings 24, under pressure, to the pad 6.

Figure 2A:
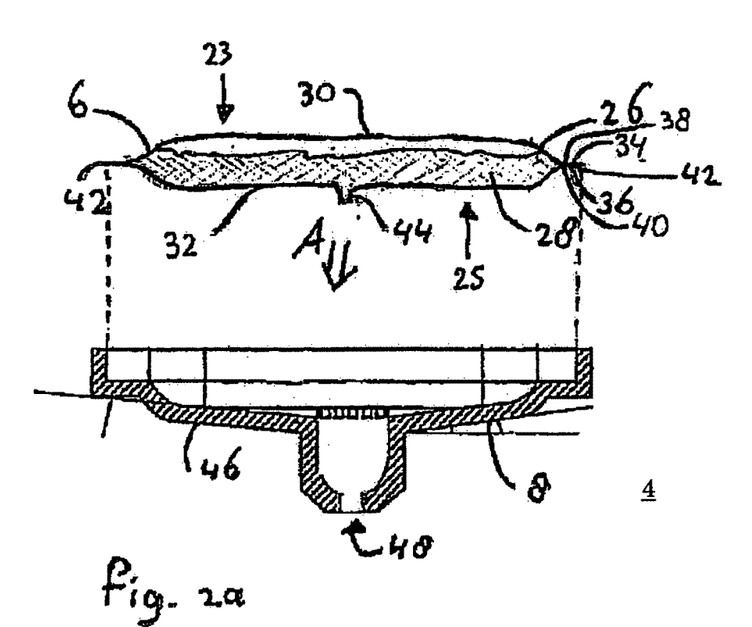
FIG. 2a shows a holder and a first embodiment of a pad according to the invention in a first position.
Figure 2B:
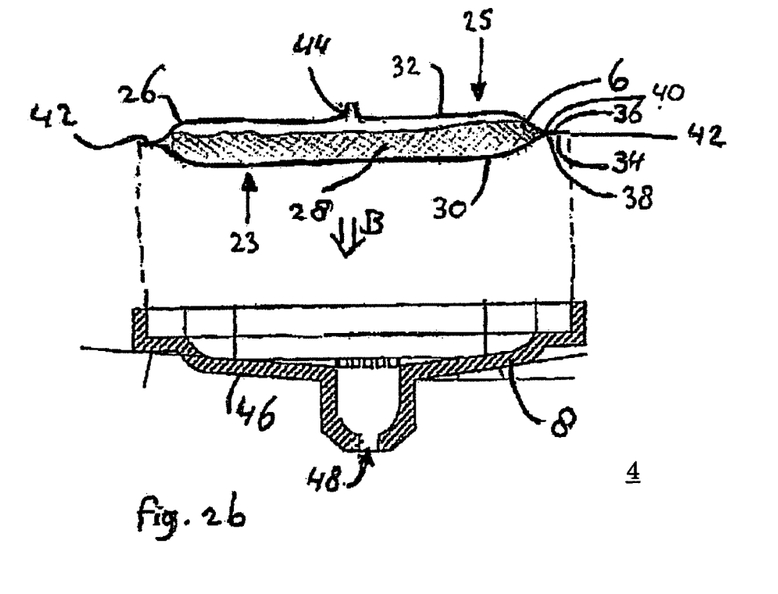
FIG. 2b shows the holder and the pad of FIG. 2a in a second position.
Figure 3:
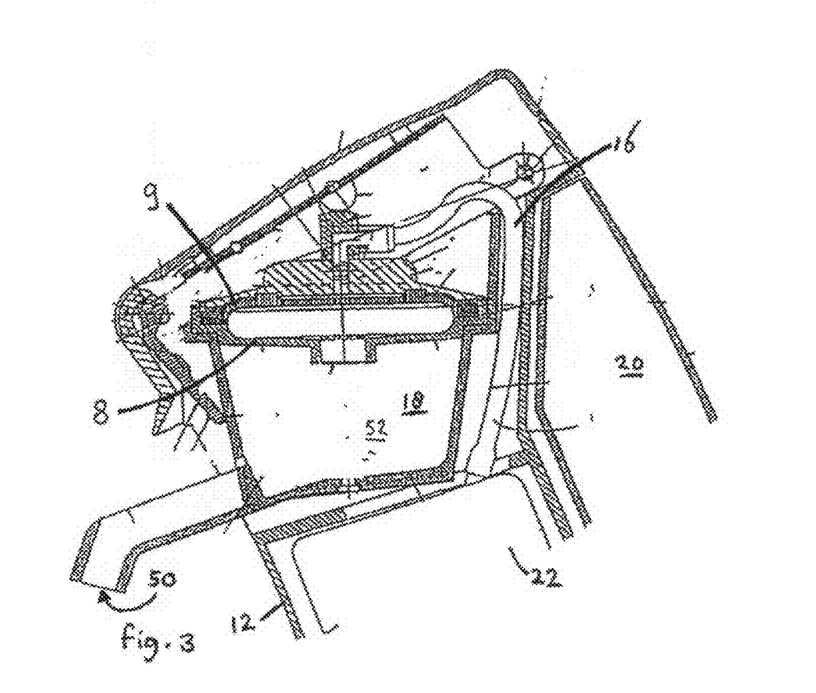
FIG. 3 shows a longitudinal cross section of the beverage preparation apparatus of FIGS. 1a-1c.

In FIGS. 2a and 2b, a first embodiment of the pad 6 is shown. The pad has a covering 26 with a first side 23 and a second side 25. A space enclosed by the covering 26 is filled with a product 28 to be extracted and/or to be dissolved, in this example, ground coffee beans. The covering 26 is provided with a first sheet 30 and a second sheet 32, each having a circumferential edge 34, 36 and each having interconnected parts 38, 40, adjacent these circumferential edges 34, 36, which parts 38, 40, in this embodiment, form an annular sealing seam 42. The first sheet 30 forms the first side 23 of the covering and the second sheet 32 forms the second side 25 of the covering 26.

In FIGS. 2a and 2b, the product 28 is located between the first and the second sheet 30, 32, i.e. between the first and the second side 23, 25 of the pad 6.

The pad 6 is further provided with a spout opening 44 for spouting the extract and/or the solution. The spout opening 44 is in fluid communication with the space enclosed by covering 26. The spout opening 44 can be included in the second sheet 32, with the second sheet 32 designed to be virtually non-transmissive to the fluid, the beverage and the product. The spout opening 44 can also be included on or at the second sheet 32, with the second sheet 32, apart from the fluid communication, designed to be virtually non-transmissive to the fluid, the beverage and the product. The second sheet 32 could be manufactured from a plastic, but also from a ceramic material, metal, biodegradable plastic or a rubber. In this embodiment, the first and the second sheet 30, 32 are undetachably interconnected.

In this example, the first sheet 30 is formed completely from filtering material, which filtering material is suitable for holding the product 28, for instance the ground coffee beans, in the pad 6 while the filtering material is transmissive to the fluid and the beverage. Such a filtering material is, for instance, filtering paper. In this manner, the covering 26 is designed on the first side 23 as a filter which is transmissive to the fluid and the beverage and is at least virtually non-transmissive to the product 28, i.e. forms a barrier for the product 28 in dissolvable and/or extractable condition, and the residue of the product.

In FIGS. 2a and 2b, further, the holder 8 for holding the pad 6 is shown. The forms of the pad 6 and the holder 8, respectively and, in this example also the holder lid 9 (see also FIGS. 4a and 4b), are adjusted to each other in a manner such that an assembly of the pad 6 and the holder 8 can be obtained in two manners, suitable for use in the coffee machine 1. To that end, in the examples, the pad 6 is of substantially symmetrical design relative to a plane of symmetry between the first and second sheet, extending substantially parallel to the first and second sheet. In this example, the holder 8 comprises, at least in use, a supporting part 46 placed downstream of the pad 6 and a fluid passage in the form of an opening 48.

A first possibility for placing the pad 6 in the holder 8 is shown in FIG. 2a, in which, by means of arrow A, it is shown how the pad 6 can take up a first position, in which first position the second sheet 32 of the pad 6 abuts against the supporting part 46 and the spout opening 44 is in or near the opening 48.

A second possibility for placing the pad 6 in the holder 8 is shown in FIG. 2b, in which, by means of arrow B, it is shown how the pad 6 can take up a second position, in which second position the first sheet 30 of the pad 6 abuts against the supporting part 46. Consequently, the second sheet 32 is on a side of the product 28 remote from the supporting part 46 of the holder 8.

Both in the above-described first position and the above-described second position, the pad 6 and the holder 8 form an assembly that is placeable in the coffee machine 1, as also shown in FIG. 1c. Naturally, it is also possible to, first, place the holder 8 in the coffee machine 1 and after this, place the pad 6 in the holder 8 for arriving at the first or second position. After placing the pad 6 and the holder 8 in the coffee machine 1, the lid 2 can be closed, whereupon the coffee machine 1 can be activated.

The beverage preparation apparatus 1 and pad described so far can be used according to the following method for providing a beverage, frothed or not frothed, at will. A user makes a choice whether he wishes to prepare the beverage with, or without the fine bubble froth layer. Accordingly, the user chooses between the use of the pad 6 in a first or in a second condition of use. According to the selection made, the pad is used in the first condition of use or in the second condition of use. In this example, the pad 6 is placed in the first position in the holder 8 for use of the pad in the first condition of use, or the pad 6 is placed in the second position in the holder 8 for use of the pad in the second condition of use. Then, the beverage preparation apparatus 1 can be switched on for preparing the beverage, while, in this example, the beverage preparation apparatus will have water flow under pressure through the pad for obtaining a beverage that, thereupon, leaves the pad. The beverage will also leave the holder 8 and be supplied to, for instance, a mug or a cup.

Thus, the used beverage preparation apparatus 1 is designed for having the pad 6 take a first position relative to the beverage preparation apparatus 1 and by having the pad take a second position relative to the beverage preparation apparatus 1, while, in the first position, in use, the first condition of use is achieved and, in the second position, in use, the second condition of use is achieved. In this case, when providing the pad 6 in the beverage preparation apparatus 1, a user of the pad 6 and the beverage preparation apparatus 1 can choose whether a beverage with or at least virtually without the fine bubble froth layer will be prepared without the beverage preparation apparatus 1 needing to be provided with a special button or switch. The pad 6 can for instance be exchangeable in the beverage preparation apparatus 1 between the first position and the second position by reversing the pad 6 relative to the holder 8.

In use, the fluid is supplied to the pad 6 along a fluid flow path defined by the fluid supply means 16. This supply takes places at a pressure such that the spout opening 44 can be flowed through. In this example, a flow direction of the fluid in the holder 8 is independent of whether or not the pad is placed in the holder in the first or in the second position. As a rule, a pressure between 1 and 7 bar is suitable. More particularly, a pressure between 1 and 2 bar is used.

In the first condition of use, wherein the pad 6 is in the first position (see FIG. 2a), the fluid is supplied, from the reservoir 20, by the fluid dispensing unit 22, via the fluid supply means 16 and the supply openings 24, via the first side 23 of the covering 26 to the product 28 in the covering 26. In this example, the fluid flows into the pad 6 via the first sheet 30. The fluid then flows through the pad 6 and, therefore, the product 28, in a first through flow direction from the first side 23 to the spout opening 44 situated on the second side 25. Here, the first through flow direction of the pad 6 is substantially equal to the flow direction of the fluid in the holder 8. After this, the beverage obtained from the fluid and the product 28 is pressed through the spout opening 44. As a result, the beverage spouts from the spout opening 4 in the form of a jet of the beverage. Here, the spout opening 44 forms a flow restriction.

In this example, the jet of coffee spouts through the opening 48 into the buffer reservoir 18. In the buffer reservoir 18, froth is formed in the coffee as described in EP 0878158. Therefore, in this example, the beverage preparation apparatus 1 comprises frothing means 52, in this example formed by the buffer reservoir 18, for forming the fine bubble froth layer on the beverage under the influence of the jet exiting from the spout opening 44 of the pad 6. After this, via a further opening 50, the coffee leaves the coffee machine 1 for forming the coffee with the fine bubble froth layer in a cup not shown in the Figures.

It is, for instance, also possible, that the fine bubble froth layer is formed in that the jet spouts on a jet impact element (as described in WO 03/105642) or spouts on a roughened surface (as described in EP1317200). The frothing means 52 can therefore comprise, for instance, but not exclusively, a liquid surface, a jet impact element or a roughened surface.

In the second condition of use, wherein the pad 6 is in the second position (see FIG. 2b), the fluid is supplied to the pad 6 from the reservoir 20, by the fluid dispensing unit 22, via the fluid supply means 16 and supply opening 24, under pressure, to the second side 25 of the covering 26. As the space in which the product 28 is located, enclosed by the covering 26, is accessible, on the second side, to the fluid exclusively via the spout opening 44, the fluid will flow into the spout opening. The beverage preparation apparatus, for instance the holder 8 and/or the holder lid 9, is here, preferably, designed for prevention of bypass (flowing of the fluid along the pad instead of through the pad), for instance in that the sealing seam 42 is clamped in by a clamping 43, such as, for instance, an O-ring. Thus, the fluid is supplied via the spout opening 44 to the product 28 in the covering 26. Here, the spout opening 44 forms a flow restriction.

Then, the fluid flows through the pad 6 and, hence, the product 28, in a second through flow direction from the spout opening 44, located on the second side 25, to the first side 23. In this example, the second through flow direction is therefore substantially opposite to the first through flow direction. Here, in the second condition of use, the second through flow direction of the pad is substantially equal to the flow direction of the fluid in the holder. After this, the beverage obtained from the fluid and the product 28 flows on the first side, in this example through the first sheet 30, from the pad 6. Here, the holder 8 may be provided with grooves in the plane of the supporting part 46 against which the first side of the pad 6 abuts, which grooves terminate into the opening 48, for facilitating the beverage flowing from the pad 6. In this example, the prepared coffee flows into the buffer reservoir 18, where virtually no froth is formed because the beverage does not leave the pad in the form of a jet for obtaining the fine bubble froth layer. The beverage that leaves the beverage preparation apparatus via the further opening 50 has at least virtually no froth layer.

As, in the second condition of use, the spout opening forms the flow restriction, a through flow speed of the fluid through the product 28 in the covering 26 will be lower than if the flow restriction was not present. Thus, a greater efficiency of the product 28 to be extracted and/or dissolved is obtained. The reduced speed at which the beverage flows from the pad, caused by the flow restriction, will also contribute to the beverage being substantially free from the fine bubble froth layer.

In this manner, both in the first condition of use and in the second condition of use, the spout opening 44 is used as flow restriction. Therefore, in the first condition of use and in the second condition of use, the fluid experiences the same flow resistance of the pad 6. Thus, it is possible to regulate an amount of fluid to be supplied to the pad on the basis of a duration of a time period over which the fluid is supplied to the pad. Thus, a very simple beverage preparation apparatus 1 can be used which regulates the amount of fluid to be supplied to the pad on the basis of the duration of the period over which the fluid is supplied to the pad.

In FIGS. 2a and 2b, the first and the second side 23, 25 extend transversely to the flow direction of the fluid in the holder. In FIGS. 2a and 2b, further, the first and the second side 23, 25 extend transversely to the first and second through flow direction. Thus, by reversing or not reversing the pad through substantially 180°, it is selected whether the beverage with or at least virtually without the fine bubble froth layer is prepared.

Figure 4A:
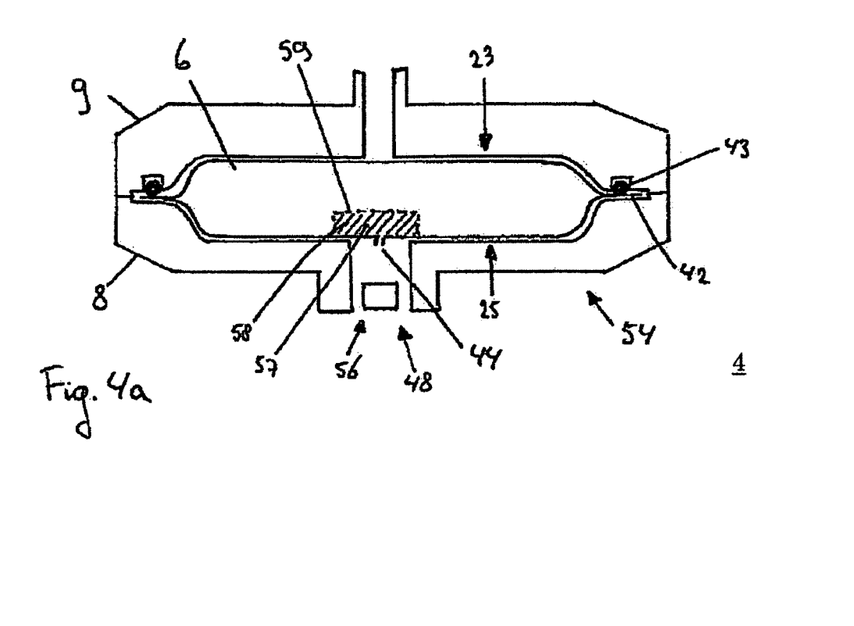
FIG. 4a shows a schematic cross section of an assembly of a holder and a pad according to the invention in a first condition of use.
Figure 4B:
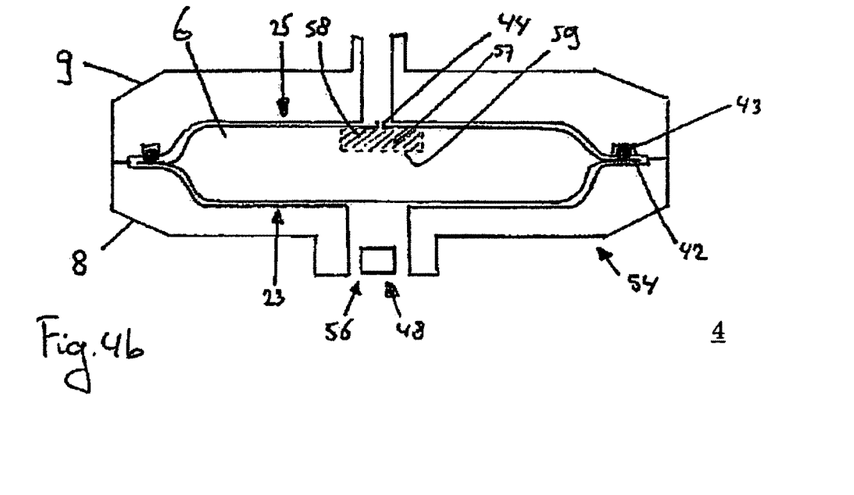
FIG. 4b shows the assembly of FIG. 4a in a second condition of use.

FIGS. 4a and 4b show an assembly 54 of a holder 8 and a pad 6. For the sake of clarity, in the FIGS. 4a and 4b, also, the holder lid 9 is shown. Here, the holder lid 9 does not necessarily form a part of the holder 8. In FIG. 4a, the pad 6 is placed in the holder 8 in the first position, for use of the pad in the first condition of use. In FIG. 4b, the pad 6 is placed in the holder 8 in the second position, for use of the pad in the second condition of use. In FIGS. 4a and 4b, the holder is provided with a bottom with the at least one opening 48. In the first condition of use (FIG. 4a), the second side of the covering rests on the bottom, while the spout opening 44 is situated above or in the opening 48 so that the jet and/or the beverage leaves the holder via the opening of the holder. In the second condition of use (FIG. 4b), the first side of the covering rests on the bottom.

In FIGS. 4a and 4b, it can be seen that the frothing means 52 of the beverage preparation apparatus 1 are formed by frothing means 56 of the holder 8 for forming the fine bubble froth layer on the beverage under the influence of the jet exiting, in the first condition of use, from the spout opening 44 of the pad 6. The frothing means 56 are designed in the FIGS. 4a and 4b as a jet impact element. It will be clear that the frothing means 56 can be designed differently too, as described with respect to the frothing means 52 of the beverage preparation apparatus 1. Provision of the holder with the frothing means 56 offers the advantage that, with the aid of the assembly of the holder 8 and the pad 6, it is possible to provide the beverage with the fine bubble froth layer in a beverage preparation apparatus.

In FIGS. 4a and 4b, the pad 6 is further provided with distancing means 58 which form a fluid flow area 57 extending between the spout opening and the product, with the fluid flow area 57 comprising an inflow surface 59, while, in use, in the first condition of use (see FIG. 4a), the fluid and/or the beverage flows into the fluid flow area 57 via the inflow surface 59, and flows out from the fluid flow area 57 via the spout opening 44. In FIG. 4a, it can also be seen that the inflow area 59 has a surface that is larger than a surface of the spout opening 44. Thus, the beverage can leave the space in which the product is located via a surface to be flowed through that is larger than when the beverage leaves the space in which the product is located via a surface to be flowed through having the size of the spout opening. As a result, the product 28 will be extracted and/or dissolved in a more efficient manner. Then, the beverage can flow through the fluid flow area 57 to the spout opening 44 in a substantially unhindered manner, so that the beverage can leave the pad 6 in an efficient manner.

As, in this example, the distancing means 58 also hold the product 28 at a distance from the spout opening 44, the spout opening 44 is prevented from becoming clogged with the product, for instance grains of ground coffee.

FIGS. 5a-5f show examples of pads 6 according to the invention for use with the method according to the invention.

Figure 5A:
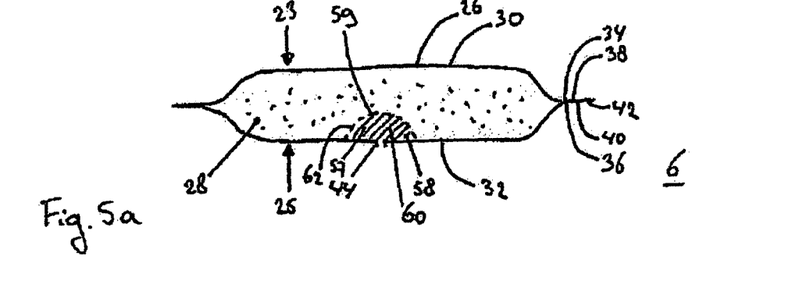
FIGS. 5a-5f show a second to seventh embodiment of a pad according to the invention.

FIG. 5a shows a second embodiment of a pad 6 according to the invention. The pad has a covering 26 with a first side 23 and a second side 25 which is filled with product 28 to be extracted and/or to be dissolved. The covering 26 is provided with a first sheet 30 and a second sheet 32, each having a circumferential edge 34, 36, and each having interconnected parts 38, 40 adjacent these circumferential edges 34, 36, which parts 38, 40, in this embodiment, form an annular sealing seam 42.

In FIG. 5a, the pad 6 is further provided with the distancing means 58. In FIG. 5a, the distancing means 58 are designed as an element 60, for instance a substantially rigid element which is transmissive to the fluid and the beverage and at least virtually non-transmissive to the product 28, i.e. forms a barrier to the product 28 in dissolvable and/or extractable condition and the residue of the product. The element 60 may comprise a piece of open cell foam, an optionally sintered grain material and/or a gauze 62. In this example, the spout opening 44 is in fluid communication with a space enclosed by the covering in which the product 28 is located. The fluid communication is formed by the fluid flow area 57 that is formed here by, for instance, the open space of the open cell foam and/or the optionally sintered grain material. In this example, the spout opening 44 is included in the second sheet 32 and the second sheet is designed to be at least virtually non-transmissive to the fluid and the beverage. This offers the advantage that the beverage is dispensed at least virtually exclusively via the spout opening 44.

Figure 5B:
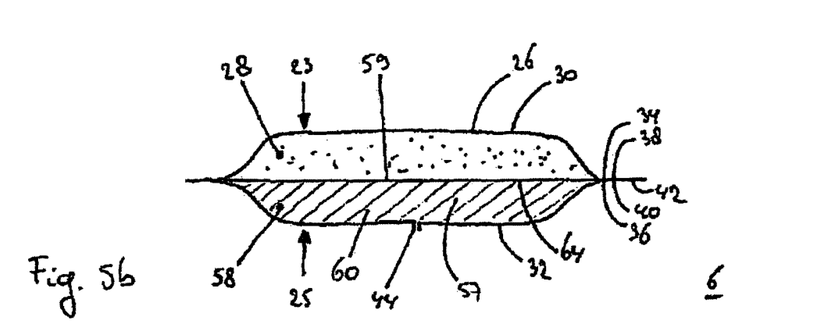

FIG. 5b shows a third embodiment of a pad 6 according to the invention. In this example, the distancing means 58 extend substantially over the entire width of the pad 6 over which the product 28 extends also. The distancing means can comprise an element 60, for instance a substantially rigid element, as described on the basis of FIG. 5a. The distancing means can also comprise a loose-grained material. In that case, it is of advantage if the pad 6 is provided with a third sheet 64 for holding the loose-grained material separated from the product 28. The third sheet 64 may be manufactured from filtering material. Here, the fluid flow area 57 is formed by the open space of the open-cell foam and/or the optionally sintered grain material. In the example of FIG. 5a, the inflow surface 59 extends substantially over an entire cross section of the covering 26 over which the product 28 extends. Thus, the prepared beverage can flow over substantially the entire cross section of the covering 26 over which the product 28 extends from the space in which the product 28 is located to the fluid flow area 57. This offers the advantage that the prepared beverage can efficiently leave the space in which the product 28 is located and can flow to the spout opening 44.

Figure 5C:
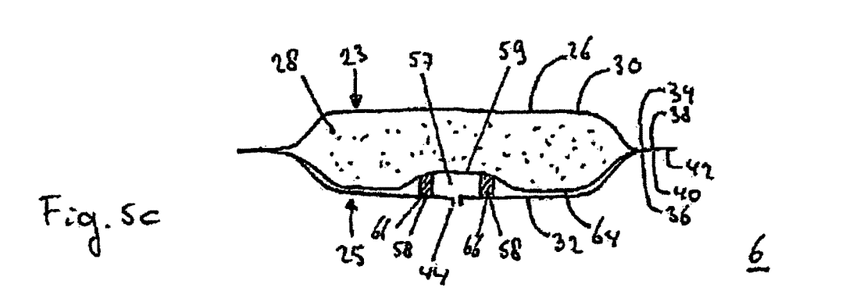

FIG. 5c shows a fourth embodiment of a pad 6 according to the invention. In this example, the distancing means 58 are formed by a rib 66 or a plurality of ribs 66 which, in this example, hold the third sheet 64 at a distance from the spout opening 44. Thus, the fluid flow area 57 is formed by an open space between the third sheet 64 and the spout opening 44. In this example, the spout opening 44 is included in the second sheet 32 and the second sheet is designed to be at least virtually non-transmissive to the fluid. In this example, the second sheet 32 can be designed as, for instance, a substantially rigid tray of, for instance, plastic. In this example, the third sheet 64 is manufactured from filtering material.

Figure 5D:
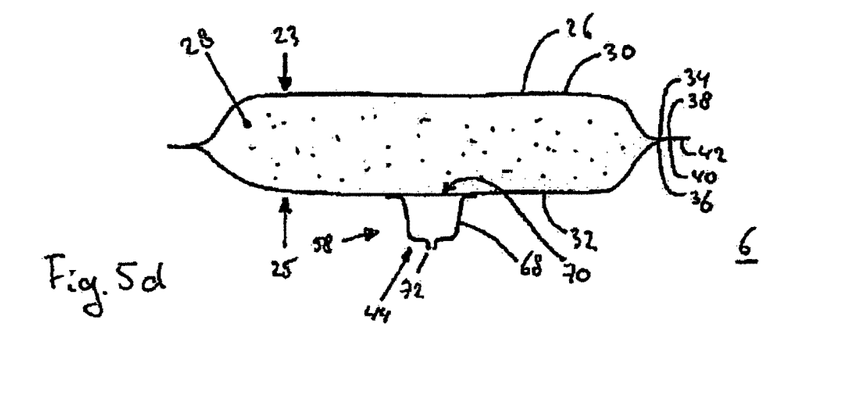

FIG. 5d shows a fifth embodiment of a pad 6 according to the invention. In FIG. 5d, the spout opening 44 comprises a spout element 68 provided with an inflow opening 70 and a dispensing opening 72, while inflow opening 70 is connected via a fluid communication with the space enclosed by the covering and the dispensing opening 72 is designed for generating a jet of the beverage with the dispensing opening 72. In this example, the spout element 68 is attached on an outside of the pad 6, in this example on the second side 25 of the covering 26, more specifically on the second sheet 32. In this example, the inflow opening 70 of the spout element has a larger cross section than the dispensing opening 72. Thus, the prepared beverage can flow via the larger cross section of the inflow opening 70 from the covering 26, so that the beverage is discharged from the pad 6 in an efficient manner. In this example, the second sheet 32 is designed, aside from the inflow opening 70, to be at least virtually non-transmissive to the fluid. To this end, the second sheet 32 is manufactured from, for instance, filtering material and, aside from the inflow opening 70, provided with a coating that is substantially impervious to the fluid and the beverage.

Figure 5E:
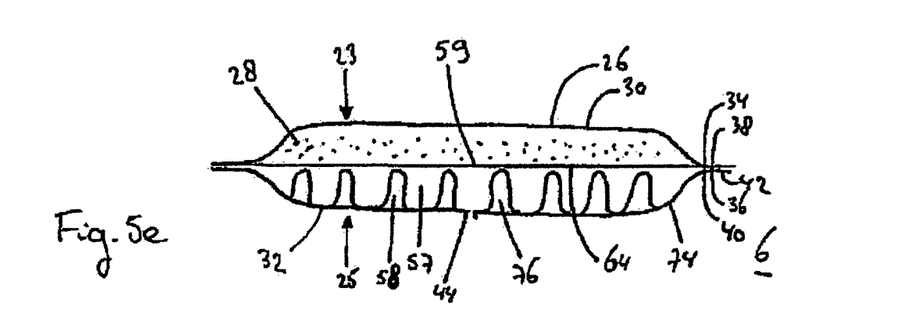

FIG. 5e shows a sixth embodiment of a pad 6 according to the invention. In FIG. 5e, the pad 6 is provided with a substantially rigid dish part 74. In this example, the spout opening 44 is included in the dish part 74. Here, the dish part 74 is preferably at least virtually impervious to the fluid and the beverage. In this example, the product 28 is included between the first and the third sheet 30, 64. In FIG. 5e, the dish part 74 is further provided with distancing means 58, which, in this example, comprise the third sheet 64 and hold the spout opening 44 at a distance from the third sheet, and, hence, the product 28. In this example, the distancing means 58 comprise a plurality of rods 76. The third sheet 64 rests on the tops of the rods 76. Thus, the spout opening 44 is placed at a distance from the third sheet 64. The dish part 74 and the plurality of rods 76 can for instance be manufactured from (biodegradable) plastic.

Figure 5F:
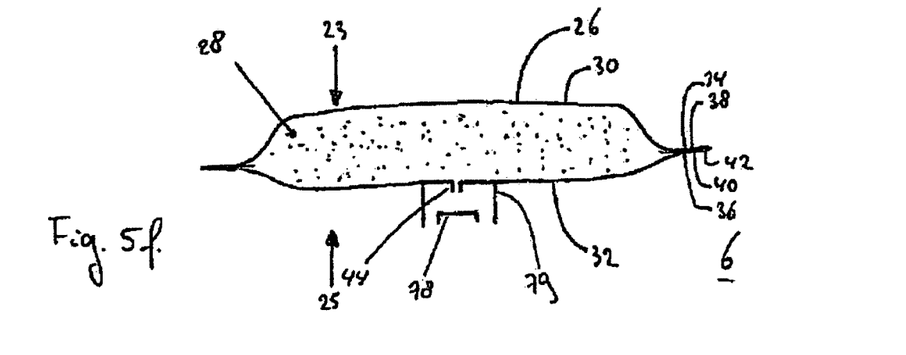

FIG. 5f shows a seventh embodiment of a pad 6 according to the invention. In FIG. 5f, the pad is further provided with frothing means 78 for forming the fine bubble froth layer on the beverage under the influence of the jet exiting, in the first condition of use, from the spout opening 44 of the pad 6. In FIG. 5f, the frothing means 78 are designed as a roughened surface. It will be clear that the frothing means 78 can also be designed differently, as described with respect to the frothing means 52 of the beverage preparation apparatus 1.

The pad shown in FIG. 5f may be provided with frothing distancing means 79 for holding the frothing means 78 at a distance from the spout opening 44. The frothing distancing means can for instance be designed as at least one rib or at least one rod. The frothing means 78 can also be included in the substantially rigid dish part 74 as shown in FIG. 5e.

The pad shown in FIG. 5f can further be provided with distancing means 58 forming the fluid flow area which extends between the spout opening and the product, with the fluid flow area comprising the inflow surface, while, in use, in the first condition of use, the fluid and/or the beverage flows into the fluid flow area via the inflow surface and flows from the fluid flow area via the spout opening. To that end, the distancing means 58 can for instance be designed as shown in one of the FIGS. 5a-5e.

The invention is not limited in any manner to the embodiments described here. It is, for instance, possible to provide an embodiment wherein not the entire first sheet is manufactured from filtering material. Also, an embodiment is possible with which the covering is formed from a frame and a number of sheets arranged in the frame.

It is possible that the pad is provided on the first and/or the second side of the covering with indicating means, for instance a text or pictogram, for indicating whether the beverage will be provided with or without the fine bubble froth layer if the fluid flows into or leaves the pad on that side.

In the examples, the pad comprises a spout opening. It is also possible that the pad comprises a plurality of spout openings for generating, with the plurality of jets, a jet or a plurality of jets of the beverage which leaves the pad for obtaining the fine bubble froth layer on the beverage with the at least one jet. It is possible that then, the pad is designed for dispensing the beverage exclusively via the at least one spout opening.

It is further possible that the pad is designed to be refillable, in that, for instance, at least a part of, the first and/or the second sheet is designed to be detachable from a rest portion of the pad 6, and/or in that the pad is provided with a valve for refilling the pad with a product.

In the examples, the product in the covering of the pad comprises ground coffee. It is also possible that the pad comprises other products to be extracted and/or to be dissolved, such as tea leaves for preparing tea. Here, when filling the pads for instance automatically, the type of pad used for being filled with a product to be specifically extracted needs not be taken into account.

All such variants are understood to fall within the framework of the invention, as set forth in the claims.

The invention claimed is:

1. A method for selectively providing beverages, one beverage provided with a fine bubble froth layer and another beverage provided substantially without a fine bubble froth layer using a pad filled with at least a product to be extracted and/or to be dissolved, the method comprising:

providing a plurality of pads, with each of the plurality of pads consisting of, a first side consisting of a liquid permeable filter sheet having a circumferential edge, and a second side consisting of a second sheet having a spout opening and a circumferential edge; the first and second side are sealed together at the circumferential edge of the filter sheet and the second sheet and enclose a product to be extracted and/or dissolved, and the spout opening is only on the second side of the pad; wherein each of the plurality of pads is usable in a first condition wherein the fluid is supplied to the product in the pad via the first side such that the fluid flows through the pad for obtaining the beverage which leaves the pad via the spout opening in the form of a jet of the beverage for obtaining a fine bubble froth layer on the beverage with the aid of the jet, and wherein each of the plurality of pads is usable in a second condition wherein the fluid is supplied to the product in the pad via the spout opening such that the fluid flows through the pad for obtaining the beverage which leaves the pad via the first side of the pad is not in the form of such a jet, so that a beverage is formed which is substantially free of such a fine bubble froth layer;

using one of the plurality of pads in the first condition by supplying a fluid, under pressure, to the first side of the pad so that the fluid is pressed through the pad to obtain a beverage having a fine bubble froth layer which, thereupon, leaves the second side of the pad;

using the another one of the plurality of pads in the second condition by supplying a fluid, under pressure, to the second side of the pad via the spout opening so that the fluid is pressed through the pad to obtain a beverage that is substantially free of a fine bubble froth layer which, thereupon, leaves the first side of the pad;

wherein, the first side of each of the pads is transmissive to the fluid and the beverage and is at least virtually non-transmissive to the product, and wherein, the second side of each of the pads is designed as a material that is at least virtually non-transmissive to the fluid, the beverage, and the product so that the fluid, the beverage and the product can only enter or exit through the spout opening.

2. A method according to claim 1, further comprising providing a holder and placing the one of the plurality of pads in the holder in the first condition to produce a beverage with a fine bubble froth layer; removing the one of the plurality of pads and then placing the another of the plurality of pads in the holder in a second condition to produce a beverage substantially free of a fine bubble froth layer.

3. A method according to claim 1, wherein a first through flow direction in the first condition of use is substantially equal to a flow direction of the fluid in the holder.

4. A method according to claim 1, wherein a second through flow direction in the second condition of use is substantially equal to a flow direction of the fluid in the holder.

5. A method according to claim 1, wherein a flow direction of the fluid in the holder in the first condition of use is equal to a flow direction of the fluid in the holder in the second condition of use.

6. A method according to claim 1, wherein the first and/or the second side extends transversely to a flow direction of the fluid in the holder.

7. A method according to claim 2, wherein the holder is provided with a bottom with at least one opening, wherein, in the first condition, the second side of the pad rests on the bottom, wherein the spout opening is situated above or in the opening so that the jet leaves the holder via the opening of the holder and wherein, in the second condition, the first side of the pad rests on the bottom.

8. A method for providing beverages having differing amounts of a froth layer, the method comprising, providing a plurality of pads, with each pad of the plurality of pads consisting of a first side consisting of a liquid permeable filter sheet having a circumferential edge and a second side consisting of a second sheet having a spout opening and a circumferential edge; wherein the first and second sides are coupled together and enclose a product to be extracted and/or dissolved, wherein the spout opening is only on the second side of the pad, the pad being usable in a first condition of use and a second condition of use;

using one of the plurality of pads in the first condition of use, wherein, in the first condition of use, fluid is supplied to the product in the covering via the first side of the covering, so that the fluid flows through the pad and leaves the pad as the beverage via the spout opening in the form of a jet of the beverage having a fine bubble froth layer; and using another one of the plurality of pads in the second condition of use wherein, in the second condition of use, fluid is supplied to the product in the covering via the spout opening so that the fluid flows through the pad and leaves as the beverage via the first side of the covering not in the form of a jet of the beverage and substantially free of a froth layer;

wherein the first side of the pad is transmissive to the fluid and the beverage and at least virtually non-transmissive to the product, and wherein the second side of the pad is designed as a material at least virtually non-transmissive to the fluid, the beverage, and the product so that fluid the beverage and the product can only enter or exit through the spout opening.

* * * * *